United States Patent [19]
Blum et al.

[11] Patent Number: 5,547,487
[45] Date of Patent: Aug. 20, 1996

[54] AMORPHOUS METAL ALLOY AND METHOD OF PRODUCING SAME

[75] Inventors: Michael E. Blum, Palo Alto; Gary L. Boerman, Santa Clara, both of Calif.; Thomas M. Fekete, Yardley, Pa.; Donald L. Horak, Pocatello, Id.; Yulig K. Kovneristy, Moscow, Russian Federation; Michael T. Orillion, Santa Clara, Calif.

[73] Assignee: FMC Corporation, Philadelphia, Pa.

[21] Appl. No.: 349,657

[22] Filed: Dec. 5, 1994

Related U.S. Application Data

[63] Continuation-in-part of Ser. No. 323,412, Oct. 14, 1994, Pat. No. 5,518,518.

[51] Int. Cl.$^6$ .................................. C21C 7/076
[52] U.S. Cl. .................. 75/10.15; 75/10.66; 75/569; 75/582; 148/403
[58] Field of Search ................. 75/10.15, 10.25, 75/10.66, 407, 558, 569, 582; 148/304, 403

[56] References Cited

U.S. PATENT DOCUMENTS

| Re. 29,989 | 5/1979 | Polk et al. | 148/403 |
|---|---|---|---|
| Re. 32,925 | 5/1989 | Chen et al. | 148/403 |
| 4,385,944 | 5/1983 | Hasegawa | 148/305 |
| 4,640,497 | 2/1987 | Heamon | 75/407 |
| 4,664,701 | 5/1987 | Royzman | 75/454 |
| 4,940,489 | 7/1990 | Cummings | 75/407 |
| 5,246,483 | 9/1993 | Streets | 75/582 |

FOREIGN PATENT DOCUMENTS

| 59-189050 | 10/1984 | Japan | 75/407 |

*Primary Examiner*—George Wyszomierski
*Attorney, Agent, or Firm*—Frank Ianno; Robert L. Andersen

[57] ABSTRACT

A process is described for producing amorphous metal alloys wherein impure ferrophosphorus slag, a by-product from a phosphorus-producing electric furnace, is used to supply phosphorus, chromium, vanadium and iron values to such alloys by mixing it with iron and any other desired metalloid and/or elements to form a molten mixture, treating the molten mixture to a separation step to remove insoluble slag formed in said molten mixture, and rapidly cooling the molten mixture to below its vitrification temperature to form a solid amorphous metal alloy.

8 Claims, No Drawings

AMORPHOUS METAL ALLOY AND METHOD OF PRODUCING SAME

This is a continuation-in part of Ser. No. 08/323,412, filed Oct. 14,1994, now U.S. Pat. No. 5,518,518.

FIELD OF THE INVENTION

This invention relates to certain amorphous metal alloys and to the method of producing them. More particularly, it relates to the production of such amorphous metal alloys from impure by-products of the electric furnace process for manufacturing elemental phosphorus, which by-products heretofore have had little commercial value.

DESCRIPTION OF THE PRIOR ART

The production of amorphous metal alloys is well known in the art as exemplified by U.S. Pat. No. 3,856,513 issued Dec. 24, 1974 and Reissue 32,925 issued May 19, 1989, both in the names of Ho-Sou Chen and Donald E. Polk. These patents teach the method of producing amorphous alloys of the formula $M_a Y_b Z_c$ wherein M is a transition metal such as Fe, Ni, Cr, Co, V or mixtures thereof; Y is a metalloid such as P, B or C or mixtures thereof, and Z is an element from the group of Al, Si, Sn, Sb, Ge, In, Be or mixtures thereof; "a" may be from 60–90 atom percent, "b" may be from 10–30 atom percent and "c" may be from 0.1–15 atom percent.

These and other known amorphous metals are produced by very rapidly cooling a liquid metal alloy at a speed on the order of $10^{6 0°}$ C./second in order to maintain the non-crystalline structure of the liquid alloy when it solidifies. In effect, the molten liquid is quenched to a temperature below the vitrification temperature to form a supercooled glass having the properties of a frozen liquid that preserves the amorphous nature of the molten alloy without converting it into a crystallized body.

One technique for carrying out such rapid cooling is to pour a continuous stream of molten metal onto a moving cooled surface, normally metal, such as a rotating metal wheel, roller(s) or belt. The cooled metal surface has a high heat transfer rate and can quench the molten metal alloy into an amorphous solid state. To obtain this high cooling rate the molten metal must be distributed on the cooled surface in a very thin film that permits the entire film to be quenched. In most instances, the amorphous metal is produced as a very thin ribbon a few mils thick and from two to ten inches in width. This same technique has also been used to produce thin wire strands of the amorphous metal alloys.

The physical and electrical properties of these amorphous ribbons or wires can only be described as remarkable, compared to their crystalline counterparts. For example, many amorphous ribbons have very little residual magnetism, allowing them to be used as cores for transformers which can be magnetized and demagnetized readily and with a very weak electrical field. Many have high tensile strengths and high resistance to corrosion in water, salt and sulfur curing compounds normally associated with rubber products. This makes them ideal for use in tires as metal tire core filaments and for reinforcement of rubber items such as hoses and power transmission belts. The high strength and resistance to corrosion also make them useful in other applications involving concrete composites such as pre-stressed concrete, cables, springs and other such load-bearing items.

They also have sufficient ductility to allow them to be bent around small curves and arcs without fracturing. This property is desirable where they are used to strengthen preformed building units by incorporating the amorphous strip within the unit around every curve and twist of the preformed piece.

Another application for these ductile amorphous metals is their use in making safety razor blades. Their ductile property allows them to be made into very thin sheets as thin as 0.001 inch, while possessing other desirable properties such as high hardness, high elastic limit and good corrosion resistance. In addition, these amorphous metal sheets are more homogeneous than common crystalline materials for the dimension characteristics of the sharpened edge of a razor blade. Such amorphous metal blades have greater hardness and can be more corrosion resistant than stainless steel blades.

The cost of preparing these amorphous alloys remains rather high because they must be fabricated from either pure elements or commercially available element sources which have a sufficiently high purity to be useful for their intended purpose. For example, U.S. Pat. No. 4,400,208 issued Aug. 23, 1983 to Luc Ackermann states that in place of pure elements it is possible to produce certain amorphous alloys from more commercially available cast granules of ferro-phosphorus to supply phosphorus and cast granules of ferrochromium to supply chromium in the amorphous alloy compositions and obtain products having atomic percent ratios of P:C greater than 1. These commercially available sources are not absolutely pure sources of phosphorus or chromium metals, respectively, in that they contain minor amounts of other non-objectionable metal impurities affiliated with them. However, such commercial metal granules must be specially prepared and cast in the form of iron-phosphorus or iron-chrome compounds, respectively, from relatively clean, semi-pure sources of these metals.

It is an object of the present invention to utilize waste materials for supplying phosphorus in the manufacture of amorphous metal alloys.

It is a further object to purify molten metal alloys produced from waste materials used to supply phosphorus in the manufacture of amorphous metal alloys.

These and other objects will be made known in the following description.

SUMMARY OF THE INVENTION

The present invention provides a process of producing an amorphous metal alloy wherein ferrophosphorus (hereinafter, "ferrophos") slag obtained from a phosphorus-producing electric furnace is used to supply metalloid phosphorus values to said alloy comprising:

a) separating the slag into an upper layer of relatively low density and a much more dense molten ferrophos layer, b) mixing said more dense molten ferrophos slag with iron to form a molten alloy having the metals and values expressed by the formula $Fe_a Cr_b V_c P_d$ where the atomic percent of each of "a" is from about 66 to about 80, "b" is from about 0.5 to about 10, "c" is from about 0.5 to about 5 and "d" is from about 8 to about 20, but wherein the total of a, b, c and d equals about 84 to about 98, c) treating said molten alloy to a separation step to remove insoluble slag formed in said molten alloy, and d) rapidly cooling the molten alloy to below the vitrification temperature of the molten alloy to convert it into a solid amorphous metal-containing alloy.

In carrying out the present invention, the ferrophos slag employed as an ingredient in the make up of the amorphous metals is obtained as a by-product from the manufacture of phosphorus in electric furnaces. In the operation of these electric furnaces, a furnace "burden" or feed is made up of calcined ore, coke and silica. The ore is initially calcined to remove volatiles before it is added to the electric furnace in order to avoid volatiles interfering with proper furnace operation.

Electrodes within the electric furnace supply sufficient power to melt the burden and convert the phosphate ore to elemental phosphorus. This elemental phosphorus along with carbon monoxide produced in the furnace reaction is then removed as a gas stream from which the phosphorus is selectively condensed and recovered. At the base of the electric furnace a molten mass remains which can be classified as two distinct types of residue. The upper layer of the molten mass is what is termed the "slag" layer that contains impurities of relatively low density that rise to the top of the molten mass. Large quantities of this slag form rather quickly and are removed from a taphole in the side of the furnace which is termed the "slag taphole". Slag taps are required rather frequently, for example, every 20 minutes or so because of the rather rapid rate at which the slag accumulates.

Below this upper layer of slag is a much more dense ferrophos layer which accumulates at a much slower rate than the slag. This crude ferrophos is tapped from the furnace through a taphole which is below that of the slag tap and is termed "ferrophos taphole". Since the ferrophos accumulates at a much slower rate than the slag, it is tapped from the furnace at much less frequent intervals, e.g., two or three times a shift. Both the ferrophos and the slag layers are tapped from the electric furnace in a molten condition and sent to various locations where they are chilled to form solids that can be readily handled for disposal and the like. When tapping the ferrophos layer and the slag layer the separation between them is not a sharp one and, therefore, the ferrophos contains substantial amounts of slag impurities. This is normally not important since the ferrophos has little commercial value when it is recovered as a by-product. In this form, the ferrophos containing substantial amounts of slag which we term "ferrophos slag" (because it contains both ferrophos and substantial amounts of slag), cannot be used in the normal manufacture of amorphous metals because the slag components, which are essentially non-metallic impurities, oxides, scum and residue from the ore and furnace operation, interfere with the proper manufacture of an amorphous metal product having the properties desired for the particular application most useful for such amorphous metals. For example, the presence of the slag causes weak spots in the amorphous metal film and deleteriously effects its electrical properties and strength properties.

In the present process, the ferrophos slag is first mixed with iron, normally in a molten state, along with whatever other alloying elements are desired in the final product, to yield the desired molten alloy. The molten alloy is then treated to a separation step to remove any insoluble slag in the molten alloy as described below. In carrying out this separation step, the mixture of ferrophos slag, iron and any other additive must be in a molten state. While it is obviously possible to melt solid ferrophos and iron in a suitable furnace so that the appropriate separation step can be carried out, it is better to use the molten ferrophos slag as it is tapped from the furnace in order to conserve heat and power. This can be done by placing the molten ferrophos slag and iron in a suitable ladle or container, which may be equipped with a heating source to prevent the molten alloy from solidifying. If the ladle or container is sufficiently insulated, the molten alloy will frequently form a thin, hard crust at the point where it is in contact with any air or a non-heated surface, but the interior will remain molten.

The separation of the slag from the molten alloy can be achieved in a number of ways. Initially, the separation can take place by allowing the molten alloy to remain quiescent and in a molten state for a sufficient time, usually from 1 to 12 hours. The molten metals are much more dense than the slag and, therefore, tend to fall to the bottom of the molten mass while the slag naturally rises to the surface of the molten mass. By allowing the molten alloy to remain quiescent, whether in a ladle or insulated container, a natural separation of the slag and molten metals take place. It does not matter if the molten alloy has a thin solidified crust on the outside of the molten mass, so long as the interior of the mass is maintained molten and quiescent. Maintaining the molten alloy quiescent is important in order to obtain maximum separation of the slag from the molten metals. After the molten alloy has been allowed to remain quiescent for a sufficient time, the upper portion, the floating slag portion, is skimmed off the molten alloy or otherwise separated as set forth below to obtain a molten alloy which is substantially free of slag.

A second means of carrying out the separatory step is to bubble an inert gas such as argon through the molten alloy. The argon is preferably preheated to avoid having any chilling effect on the molten metal and the flow of argon through the molten mass accelerates the rise of the slag to the top of the melt. The argon, or other inert gas, can be injected directly through an opening in the bottom of the container or ladle or through a hollow lance thrust down into the molten alloy. The opening at the bottom of the lance allows the argon gas or other inert gas to be released near the base of the container or ladle and bubble up through the molten mass. This method is faster than the quiescent settling method described above but it does require additional equipment and an inert gas source to operate in this fashion.

Another method for treating the molten alloy to a separatory step is to subject it to a filtration operation. The high temperature of the molten alloy dictates the use of a filter that is able to withstand such high temperatures without deteriorating. One such type of filter is made of ceramic materials resistant to these high temperatures. Hot filtering is much more difficult to carry out successfully than the two separatory procedures described above. This is because the filter can be easily plugged by materials freezing on the filter or by excess slag that blinds the holes in the filter. In order to successfully filter the molten alloy it must be hot. A typical ferrophos slag composition is:

| Metallic Components | Percent by Weight |
| --- | --- |
| Fe | 56–60 |
| P | 24.5–27.8 |
| V | 3.9–5.5 |
| Cr | 3.6–6.0 |
| Si | 0.5–4.5 |

Other metals are also found in the ferrophos, usually in amounts no greater than 1% such as nickel, manganese, and molybdenum.

As will be seen from the above table, the principal elements which are added by use of the ferrophos are iron and phosphorus. However, the ferrophos also adds chromium and vanadium to the alloy and these elements tend to increase the strength of the alloy and further to raise the recrystallization temperature of such iron based amorphous metal alloys. This facilitates heat treating such alloys in subsequent treating steps. These elements also lower the Curie temperature, or the temperature at which a material loses ferromagnetizism. Non-magnetic items normally require low Curie temperatures.

In general, it is preferred to mix the ferrophos and iron so that the proportions are about or at a eutectic mixture. Such a mixture, for example, is formed when the iron constitutes 77% of the mixture, phosphorus 19%, vanadium 2% and chromium 2%, all percents expressed as atomic percent. Therefore, the atomic formulation of this amorphous metal was $Fe_{77}V_2Cr_2P_{19}$. In general, the lower the melting temperatures of such eutectic mixtures relative to the melting point of the principal elements such as iron and phosphorus, the more readily the molten mixture can be cooled into an amorphous alloy. This is important because the lower the eutectic temperature the easier it is to cool, that is, quench the alloy into an amorphous mass, and this allows the alloy to be cooled in thicker ribbons which is advantageous from a product viewpoint. Normally, ribbons have to be very thin because of the necessity to quench the entire mass in the ribbon at very high cooling rates.

The phosphorus-stabilized amorphous alloys have advantages over known boron-based counterparts in that they have generally superior corrosion resistance. However, it is possible to replace some of the phosphorus with boron, or if desired, simply add boron values to the glass if greater thermal stability, that is, the ability to be easily heat treated without embrittlement, is desired in the glass. However, the present glasses which contain both chromium and vanadium as a result of the added ferrophos, already will have improved properties respecting corrosion, strength and higher recrystallization temperature.

In all events, the resulting amorphous alloy formed in the present invention has metals and values that may be expressed by the formula $Fe_aCr_bV_cP_d$ where the atomic percentage of each of "a" is from about 66 to about 80 (preferably about 70 to about 80), "b" is from about 0.5 to about 10 (preferably about 0.5 to about 5), "c" is from about 0.5 to about 5 and "d" is from about 8 to about 20 (preferably about 9 to about 20), and where the total of "a", "b", "c" and "d" equal at least about 84 (preferably about 88 to about 98). In the above formula, there can also be added as additional polyvalent metalloid, elements such boron, silicon, germanium, etc. either in addition to or as a partial substitute for phosphorus. Other elements employed in such amorphous alloys may also be added such as Al, Si, Sn, Sb, Ge, In, Be and mixtures thereof.

In essence, the molten ferrophos is employed as a source of iron, phosphorus, chromium and vanadium in alloys used to prepare amorphous metals, usually in the form of ribbons or wires. Other well known elements in the art employed in such alloys can be added along with additional iron to form such desired amorphous metal products. However, we have found that iron-phosphorus based amorphous metals are very desirable when the iron contents are greater than 75 atomic percent because of the improved electromagnetic properties of such alloys. Obviously, modification of such alloys can be made by inclusion of other elements or by varying the relative percentages of elements in these amorphous metals to improve other properties of the metals, for example, recrystallization temperatures and heat stability so that the alloys can be heat treated subsequently at increasingly high temperatures.

The practice of the present invention will now be described with reference to the following examples.

EXAMPLE 1

A ferrophos sample recovered from the base of a phosphorus producing electric furnace was found to have the following composition, in weight percent: Fe-57.3; $P_4$-26.67%; Cr-5.7%; V-5.9%; CAO-0.29%; Si-0.45%. The molten ferrophos is mixed with molten iron to form a molten alloy yielding the ribbon composition set forth below. The alloy is held in a molten condition under quiescent conditions for ten hours; a floating slag layer forms and floats on top of the molten alloy. The slag is skimmed off and separated from the remaining molten alloy, now reduced in slag impurities. The molten alloy is poured on a rotating metal wheel and chilled to below its vitrification temperature to form a thin continuous ribbon. Ribbons are made from one mm to five mm wide, with thickness of from 30 microns to 60 microns, having amorphous structures and having the composition, in atomic percent, of $Fe_{77}Cr_2V_2P_{19}$. They have the following properties:

| | |
|---|---|
| Ultimate tensile strength | 1250 MPa |
| Micro Hardness | 628–730 kg/m² |
| Magnetic Saturation Induction | 9000 Gausses |
| Ductility, number of 180° bendings without ribbon fracture | 2 |
| Specific Electrical Resistivity (ρ) | 230 μ-ohm-cm |
| Glass Transition Temperature (Tg) in °C. | 445° C. |
| Hysteresis | closed hysteresis loops, 1.5 times wider than conventional Fe—B—Si amorphous ribbon products |

EXAMPLE 2

The procedure of Example 1 is employed, except that the molten alloy is treated by bubbling argon through it by means of a hollow lance inserted into the melt. The argon enters the lance at the top and exits from the bottom of the lance at the base of the molten alloy. The resulting slag that floats to the top of the molten alloy, after discontinuing argon flow, is skimmed off in the same manner as Example 1 and the molten alloy is recovered and chilled as in Example 1. Upon chilling, the molten alloy ribbons are formed similar to those of Example 1.

We claim:

1. Process of producing an amorphous metal-containing alloy wherein ferrophos slag from a phosphorusproducing electric furnace is used to supply metalloid phosphorus values to said alloy comprising:

a) separating the slag into an upper layer of relatively low density and a much more dense molten ferrophos layer, b) mixing said more dense molten ferrophos slag with iron to form a molten alloy comprising the metals and values expressed by the formula $Fe_aCr_bV_cP_d$ where the atomic percentage of "a" is from about 66 to about 80, "b" is from about 0.5 to about 10, "c" is from about 0.5 to about 5, and "d" is from about 8 to about 20, but wherein the total of "a", "b", "c" and "d" equals about 84 to about 98, c) treating said molten alloy to a separation step to remove insoluble slag formed in said molten alloy, and d) rapidly cooling the molten alloy to below the vitrification temperature of the molten alloy to convert into a solid amorphous metal alloy.

2. Process of claim 1 wherein the separation step of c) is carried out by allowing the molten alloy to settle under quiescent conditions wherein the slag rises to the top and is removed.

3. Process of claim 1 wherein the separation step of c) is carried out by bubbling argon or other inert gas through the molten alloy wherein the slag rises to the top and is removed.

4. Process of claim 1 wherein the separation step of c) is carried out by hot filtration of the molten alloy thereby filtering out slag from a purified molten alloy that passes through the filter and is recovered.

5. Process of claim 1 wherein the molten alloy formed by mixing the molten ferrophos slag and iron comprises the metals and values expressed by the formula $Fe_aCr_bV_cP_d$ where the atomic percentage of each of "a" is from about 70 to about 80, "b" is from about 0.5 to about 5, "c" is form about 0.5 to about 5 and "d" is from about 8 to about 20, and where the total of "a", "b", "c" and "d" equals about 88 to about 98.

6. Process of claim 1 wherein the amorphous metal-containing alloy is $Fe_{77}V_2Cr_2P_{19}$.

7. Process of claim 1 wherein said more dense molten ferrophos slag contains from about 56% to about 60% by weight iron, about 24.5% to about 27.8% by weight P, about 3.9% to about 5.5% by weight vanadium, and about 3.6% to about 6.0% by weight of chromium.

8. Process of claim 1 wherein the molten alloy is at about a eutectic composition.

* * * * *